(12) United States Patent
Saez Cruz et al.

(10) Patent No.: US 12,233,774 B2
(45) Date of Patent: Feb. 25, 2025

(54) THROUGH-TYPE TAILLIGHT AND VEHICLE HAVING SAME

(71) Applicant: VALEO VISION, Bobigny (FR)

(72) Inventors: Encarnacion Saez Cruz, Martos (ES);
Pedro-Jose Ruiz Rosa, Martos (ES);
Pedro Colmenero, Martos (ES)

(73) Assignee: Valeo Vision, Bobigny (FR)

( * ) Notice: Subject to any disclaimer, the term of this patent is extended or adjusted under 35 U.S.C. 154(b) by 291 days.

(21) Appl. No.: 17/770,664

(22) PCT Filed: Oct. 27, 2020

(86) PCT No.: PCT/EP2020/080197
§ 371 (c)(1),
(2) Date: Apr. 21, 2022

(87) PCT Pub. No.: WO2021/083906
PCT Pub. Date: May 6, 2021

(65) Prior Publication Data
US 2022/0355727 A1    Nov. 10, 2022

(30) Foreign Application Priority Data
Oct. 28, 2019   (CN) .......................... 201911040722.9

(51) Int. Cl.
*B60Q 1/26*      (2006.01)
*B60Q 1/30*      (2006.01)

(52) U.S. Cl.
CPC .......... *B60Q 1/2649* (2013.01); *B60Q 1/2623* (2013.01); *B60Q 1/304* (2022.05)

(58) Field of Classification Search
CPC ..... B60Q 1/2623; B60Q 1/304; B60Q 1/2649
See application file for complete search history.

(56) References Cited

U.S. PATENT DOCUMENTS 5,150,939 A  * 9/1992  Simin ................. B62D 25/087
                                                    296/37.16
6,217,203 B1   4/2001  Rogers et al.
(Continued)

FOREIGN PATENT DOCUMENTS

CN       203580758 U      5/2014
CN       207815203 U      9/2018
(Continued)

OTHER PUBLICATIONS

European Patent Office, International Search Report and Written Opinion of corresponding international application No. PCT/EP2020/080197, dated Jan. 22, 2021.

(Continued)

*Primary Examiner* — Julie A Bannan
(74) *Attorney, Agent, or Firm* — Valeo Vision (57) ABSTRACT

The present invention relates to a through-type taillight and a vehicle having same. Specifically, the through-type taillight is installed in an accommodation of a vehicle tail component, and has an outer lens, a housing and a side part, the housing being closed by the outer lens, and together with the outer lens defining an accommodating space for accommodating an optoelectronic component of the through-type taillight, wherein the side part is arranged on a side of the housing in such a way as to prevent loosening, and at least occupies a first position and a second position relative to the housing, such that in the first position the through-type taillight can be fitted into the accommodation, and in the second position the side part forms a corresponding compensating face of the vehicle tail component.

17 Claims, 4 Drawing Sheets

(56) References Cited

U.S. PATENT DOCUMENTS

| | | | |
|---|---|---|---|
| 11,904,952 B2 * | 2/2024 | Harmon | ................. B60R 13/01 |
| 2018/0208104 A1 | 7/2018 | Kennemer et al. | |
| 2018/0264991 A1 | 9/2018 | Ellwanger | |

FOREIGN PATENT DOCUMENTS

| | | | |
|---|---|---|---|
| CN | 109282240 A | 1/2019 | |
| CN | 208457856 U | 2/2019 | |
| CN | 209245875 U | 8/2019 | |
| FR | 2201429 A1 | 4/1974 | |

OTHER PUBLICATIONS

China National Intellectual Property Administration (CNIPA), Office Action (with English translation) of corresponding CN Patent Application No. 201911040722.9, dated Dec. 14, 2024.

* cited by examiner

THROUGH-TYPE TAILLIGHT AND VEHICLE HAVING SAME

CROSS-REFERENCE TO RELATED APPLICATIONS

This application is filed under 35 U.S.C. § 371 U.S. National Phase of International Application No. PCT/EP2020/080197 filed Oct. 27, 2020 (published as WO2021083906), which claims priority benefit to Chinese Application No. 201911040722.9 filed on Oct. 28, 2019, the disclosures of which are herein incorporated by reference in their entirety.

TECHNICAL FIELD

The present invention relates to a through-type taillight and a vehicle having same.

BACKGROUND OF THE INVENTION

As LED and OLED lighting technologies have emerged and matured, through-type taillights are becoming more and more popular with vehicle companies. Besides looking cool, through-type taillights also have a safety advantage, mainly because the enlarged light output area enables a vehicle equipped with through-type taillights to be noticed and identified by a following vehicle more easily, thereby reducing a risk of collision.

BRIEF SUMMARY OF THE INVENTION

Through-type taillights are installed in a tail component (such as a trunk lid) of the vehicle. For this purpose, an accommodation such as an accommodating recess for installing the through-type taillight is reserved in the tail component. When installation is performed, the through-type taillight is pushed into the accommodation.

However, in some situations, due to structural restrictions of the tail component, a side part of the through-type taillight will hinder the operation of pushing the through-type taillight into the accommodating space. In such a situation, one conventional approach is to first of all push a through-type taillight body into the accommodating space, and then install the side parts separately on the through-type taillight body once the through-type taillight body occupies the correct position in the accommodating space. This approach requires at least one additional separate assembly step, and thus undesirably lengthens the assembly time. Furthermore, the side part must also be separately stored and transported.

An object of the present invention is to propose a through-type taillight capable of at least partially avoiding the problems mentioned above.

Another object of the present invention is to propose a vehicle having the through-type taillight.

The through-type taillight according to the present invention is installed in an accommodation of a vehicle tail component, and has an outer lens, a housing and a side part. The housing is closed by the outer lens, and together with the outer lens defines an accommodating space for accommodating an optoelectronic component of the through-type taillight. The side part is arranged on the side of the housing in such a way as to prevent loosening, and at least occupies a first position and a second position relative to the housing, such that in the first position the through-type taillight can be fitted into the accommodation, and in the second position the side part forms a corresponding compensating face of the vehicle tail component.

This design makes it possible for a through-type taillight that has already been assembled to a large extent to be delivered to a customer in its entirety, with no need to provide an individual component such as a side part that is separate from a main portion of the pre-assembled through-type taillight, thereby avoiding the loss of parts and reducing additional warehousing costs. Here, the main portion can be understood to be a portion comprising the main components of the through-type taillight, e.g. an assembly including the housing, an optoelectronic module held at the housing, a lens, etc. Depending on the specific conditions of the through-type taillight accommodation, the side part occupies at least two different positions, and final assembly can be completed in a simple manner while ensuring that the relevant components are not damaged, thus helping to reduce the load on operating personnel.

The side part is moveably connected to the housing on its side that faces the outer lens, such that the side part can be moved from the first position into the second position. "Moveably connected" can be understood to mean that the side part can change position relative to the housing, such that the side part can occupy at least two different positions.

According to an embodiment of the present invention, the housing has a groove on the side facing the outer lens, and an edge of the side part lies in the groove, wherein the dimensions of the groove are matched to the dimensions of the edge, such that the side part can rotate in the groove.

The edge of the side part is provided with a recess, a protrusion is provided in the groove, and the protrusion interacts with the recess. Specifically, the protrusion is accommodated in the recess, thereby limiting shifting of the side part relative to the housing in a direction.

Additionally, at least one additional protrusion is provided in the groove. The edge of the side part abuts against the additional protrusion. Compared with direct contact between the edge of the side part and a bottom of the groove, this design can reduce the manufacturing precision of the relevant components while ensuring the required positioning precision, thereby lowering costs.

A region of the housing that is adjacent to the groove is provided with at least one projection, and the side part can abut against the projection; or a region of the side part that is adjacent to the edge is provided with at least one projection, and the housing can abut against the projection.

The through-type taillight according to the present invention is provided with a limiting structure, comprising at least one first limitation on one of the housing and the side part and at least one first mating limitation on the other, in order to limit movement of the side part in a first direction, and thereby avoid disengagement from the housing.

The through-type taillight according to the present invention is further provided with a first locking structure, to limit movement of the side part in the first position in a second direction; and is further provided with a second locking structure, to limit movement of the side part in the second position in the second direction.

The first locking structure can take the form of a combination of a locking hook assembly and a stop. For example, the locking hook assembly comprises a first locking hook on one of the housing and the side part and a first mating locking hook on the other.

The second locking structure takes the form of a lock-fastening assembly. For example, the lock-fastening assembly comprises at least one engagement hook on one of the housing and the side part and at least one fastening eye on the other.

In the solution mentioned above, the side part can be regarded as a lever, wherein the corresponding projection disposed at the housing or side part forms a fulcrum of the side part, the edge of the side part forms a force-bearing point, and the locking structure disposed at the side part forms a force application point. Since the movement of the edge is restricted by the groove, when the locking hook or mating locking hook disposed at the side part is engaged in the corresponding mating locking hook or locking hook disposed at the housing, a force is applied to the force application point of the side part, thereby fixing the side part to the housing with a simple structure. In addition, shifting of the side part transversely to a direction defined by the abovementioned force-bearing point, fulcrum and force application point is prevented by means of the limitation and mating limitation, to further ensure a stable connection.

According to an embodiment of the present invention, the first limitation takes the form of an elastic plate, the first mating limitation takes the form of a hole, and the elastic plate extends into the hole. In this case, the same limiting structure can be used for limiting, thereby simplifying the structural design, and facilitating assembly.

According to an embodiment of the present invention, the side part has a body and a flexible part arranged on a periphery of the body. In an installed state, the flexible part can cover a gap between the housing and the accommodation of the vehicle tail component. A manufacturing tolerance between the side part and the vehicle tail component can be better compensated by means of the flexible part, in order to lower the manufacturing cost.

The body and flexible part can be separately formed components, which are then connected together by a suitable connection method, e.g. bonding, snap-fitting, etc. Preferably, the side part formed by the body and flexible part is a one-piece member formed by two-component injection molding.

According to an embodiment of the present invention, constituent parts of the limiting structure and locking structures, i.e. the limitation and mating limitation and the locking hook and mating locking hook are integrally formed on the body of the side part or on the housing, e.g. by injection molding. This enables simple manufacturing.

BRIEF DESCRIPTION OF THE DRAWINGS

The present invention is expounded further below with the aid of schematic drawings. In the drawings.

DETAILED DESCRIPTION OF THE INVENTION

Embodiments of the present invention are described demonstratively below. As those skilled in the art should realize, the embodiments described can be modified in various ways without departing from the concept of the present invention. Thus, the drawings and the description are in essence demonstrative and non-limiting. In the following text, identical references generally indicate functionally identical or similar elements.

Figure 1:
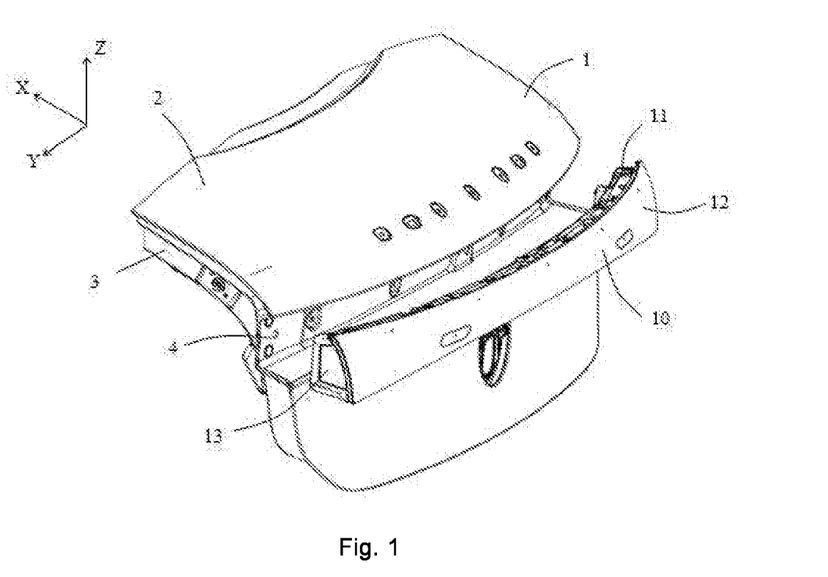
FIG. 1 shows schematically, in an exploded view, a vehicle tail component equipped with a through-type taillight.

A tail portion of a vehicle is shown schematically in FIG. 1. Here, only a vehicle tail component 1 in the form of a trunk lid and a through-type taillight 10 installed therein are shown in a simplified form. To facilitate explanation here and herein below, reference is made here to a coordinate system used for the vehicle, that is, when the vehicle is in a stationary state on a horizontal road, the X axis is parallel to the ground and points towards a region in front of the vehicle (also called a first direction), the Z axis points upwards through the center of mass of the vehicle (also called a third direction), and the Y axis points towards the left side of a driver (also called a second direction). Here, an accommodation 4 for the through-type taillight 10 is formed in the vehicle tail component 1, and extends over the entire width of the vehicle tail component 1 in the Y direction. The through-type taillight 10 is fitted by pushing in the X direction, such that when it occupies the correct position in the accommodation 4, an outer surface 2 and a side face 3 of the vehicle tail component 1 that were interrupted due to the accommodation 4 are covered by an outer lens 12 and a side part 13 of the through-type taillight 10, thereby forming a complete outer contour of the vehicle tail portion.

However, in some situations, the through-type taillight 10 cannot be directly pushed into the corresponding accommodation 4, in particular due to geometric structural restrictions of the side part. For example, in the case where a region of the side part 13 of the through-type taillight 10 adjacent to the accommodation 4 is flexible, this can cause deformation of the side part 13 during assembly, thereby adversely affecting assembly quality.

The through-type taillight 10 according to the present invention is expounded further below with the aid of FIGS. 2-7. Since the through-type taillight 10 is a symmetric structure, only the left side of the through-type taillight 10 is expounded here; for the structure of the right side, the explanation of the structure of the left side can be referred to.

Figure 2:
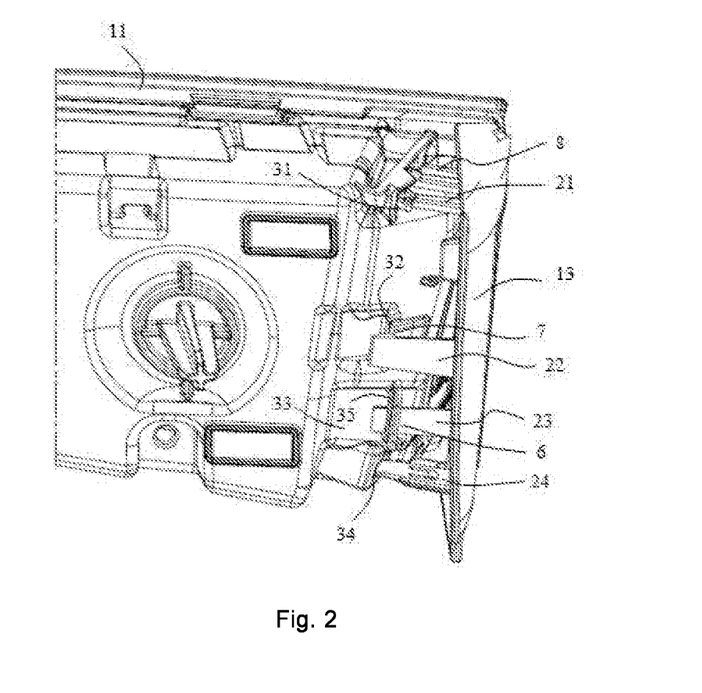
FIG. 2 shows schematically a first state of a side part of the through-type taillight according to the present invention.
Figure 3:
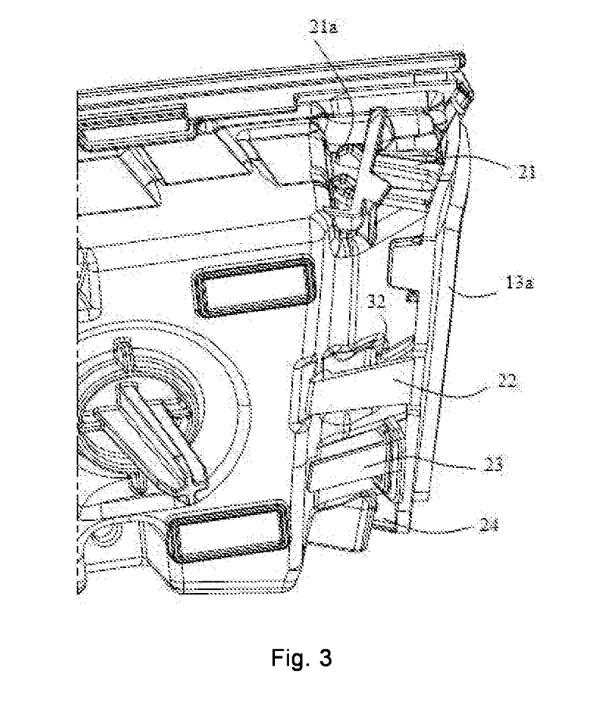
FIG. 3 shows schematically a second state of a side part of the through-type taillight according to the present invention.

The through-type taillight 10 is also accommodated in the accommodation 4 of the vehicle tail component 1, and has the outer lens 12, a housing 11 and the side part 13. The housing 11 is closed by the outer lens 12, and together with the outer lens 12 defines an accommodating space for accommodating an optoelectronic component, not shown here, of the through-type taillight 10. The side part 13 is arranged on the side of the housing 11 in advance in such a way as to prevent loosening, and at least occupies a first position I (see FIG. 2) and a second position II (see FIG. 3)

relative to the housing 11, such that in the first position I the through-type taillight 10 can be fitted into the accommodation 4, and in the second position II the side part 13 forms a corresponding compensating face of the vehicle tail component 1.

Figure 4:
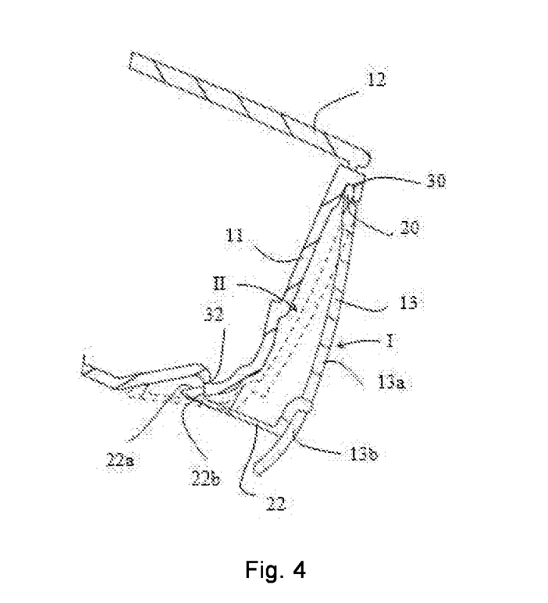
FIG. 4 shows a sectional view of a locking structure of the through-type taillight according to the present invention, wherein the locking structure in a first position is shown by solid lines, and the locking structure in a second position is shown by dotted lines.
Figure 5:
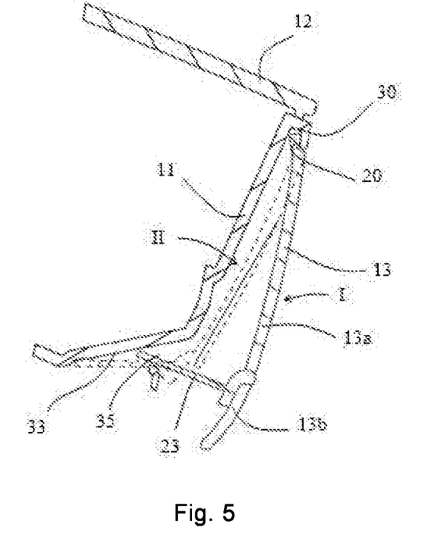
FIG. 5 shows a sectional view of a limiting structure of the through-type taillight according to the present invention, wherein the limiting structure in a first position is shown by solid lines, and the limiting structure in a second position is shown by dotted lines.
Figure 6:
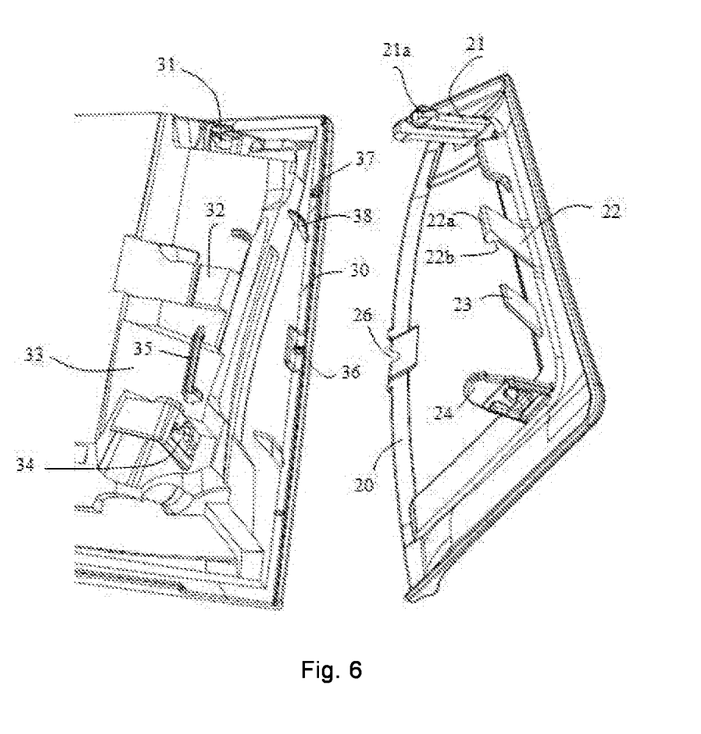
FIG. 6 shows an exploded view of the through-type taillight according to the present invention.

As can be seen especially clearly from FIGS. 4-6, the housing 11 has a groove 30 on a side facing the outer lens 12. An edge 20 of the side part 13 is accommodated in the groove 30. Here, the running of the groove 30 is matched to that of the edge 20. In order to prevent movement of the side part 13 in the groove 30 of the housing 11, a protrusion 36 is constructed in the groove 30, and a recess 26 is provided in a corresponding region of the edge 20; the protrusion and the recess interact with each other. In the example shown, the protrusion 36 and the recess 26 are disposed in a middle region, but of course could also be disposed in another suitable region. At least one additional protrusion 37 can also be provided in the groove 30, and a front edge of the side part 13 abuts against the additional protrusion 37. Thereby surface contact is changed to approximately point contact, to reduce the manufacturing precision of the corresponding components.

A moveable connection between the side part 13 and the housing 11 can also be established in other ways. For example, the side part 13 and housing 11 form a pivoting connection. For this purpose, a pivot rod is provided on one of these components, and a recess for accommodating the pivot rod is provided on the other component.

Furthermore, the side part 13 and housing 11 can also be in abutment near the abovementioned moveable connection region, which will be explained below. For this purpose, as can be seen from FIG. 6, a projection 38 is formed on the housing 11 in a position adjacent to the groove 30, and can take the form of a rib. In an assembled state, a top end of the projection 38 is in contact with an inner side of the side part 13. Of course, the projection can also be formed on the side part. The number of projections is set as required.

In order to lock the side part 13 on the housing 11, corresponding locking structures 7, 8 are also provided for example on the side of the side part that is opposite the edge 20; the locking structures enable the side part 13 to be locked in at least two positions. Here, the first position I can be regarded as a delivered state, and the second position II can be regarded as a final assembled state.

In this case, a limiting structure 6 is provided, comprising at least one first limitation on one of the housing 11 and the side part 13 and at least one first mating limitation on the other, in order to limit movement of the side part 13 in the X direction, i.e. the first direction, and thereby prevent the side part from falling off the housing. For example, a first limitation in the form of an elastic plate 23 is provided on the side part 13; a hollow frame-like part is formed on the housing, and defines a first mating limitation in the form of a hole 35. The elastic plate 23 extends into the hole 35. As can be seen especially clearly from FIG. 5, in the first position I and second position II, the elastic plate 23 is correspondingly deformed elastically, and one side of the elastic plate 23 abuts against an inner wall of the frame-like part forming the hole 35, thereby preventing the side part mounted on the housing from disengaging from the housing in the first direction. The top of the elastic plate 23 can slide on a corresponding surface 33 of the housing.

In addition, locking structures are also provided to lock the occupied position of the side part 13 relative to the housing 11 in the first position I and second position II, i.e. prevent the side part 13 from shifting relative to the housing 11 in the Y direction, i.e. the second direction, in the first position I and second position II respectively.

In the example shown, in order to perform locking in the first position I, a first locking structure 7 is provided, which takes the form of a combination of a locking hook assembly and a stop, in order to limit movement of the side part 13 in the Y direction, i.e. the second direction. For this purpose, a first locking hook 22 is provided on the side part 13, and a first mating locking hook 32 is provided on the housing 11. The first locking hook 22 can deform elastically, and has a protruding head. The protruding head has a triangular cross section. The first mating locking hook 32 can be regarded as another protruding head. In the process of moving from an initial position to the first position, the first locking hook 22 deforms elastically, and once a first surface 22a of the protruding head thereof has slid past the protruding head of the first mating locking hook 32, the first locking hook 22 springs back, such that a second surface 22b is engaged with the first mating locking hook 32; the first locking hook 22 thereby hooks onto the first mating locking hook 32, and establishes a locking connection, see the state indicated by the solid lines in FIG. 4.

In order to prevent the side part 13 from continuing to move towards the middle of the housing in the Y direction due to external force when the first locking hook 22 hooks the first mating locking hook 32, the first locking structure 7 is further provided with a stop. As can be seen from FIG. 2, the stop comprises protruding parts in the form of engagement hooks 21, 24, which extend out from the side part 13 towards the housing, and abut against the housing 11 in the first position I, thereby preventing the side part 13 from continuing to move towards the housing in the state in which the first locking hook 22 and first mating locking hook 32 are engaged in the Y direction. In the first position I, the side part 13 can be regarded as having been rotated relative to the housing 11 by a certain angle around the edge 20 in a direction away from the housing 11, such that a space for an edge of the accommodation is left between the side part 13 and the housing 11, and the through-type taillight can be fitted into the reserved accommodation without damage.

When it is necessary to move the side part 13 from the first position I into the second position II, all that need be done is to apply a force to the side part 13 in a direction towards the middle of the housing; this force can overcome the effect of the stop. When the side part 13 has moved into the second position II, movement of the side part 13 in the second direction can be limited in the second position II by means of a second locking structure 8.

The second locking structure 8 for example takes the form of a lock-fastening assembly, comprising at least one engagement hook 21, 24 on one of the housing 11 and the side part 13 and at least one fastening eye 31, 34 on the other. It can be seen here that besides forming the stop for the first locking structure 7, the engagement hooks 21, 24 are also constituent parts of the second locking structure. For this purpose, the engagement hooks 21, 24 are constructed to be elastically deformable. Before elastic deformation, top ends of the engagement hooks abut against the edges of the fastening eyes of the housing. When an external force is applied to make the engagement hooks deform elastically, the engagement hooks can pass through the fastening eyes 31, 34, and hook the opposite edges of the fastening eyes 31, 34, to prevent disengagement of the engagement hooks from the housing. Preferably, the tops of the engagement hooks abut against a wall of the housing, to prevent the side part from continuing to move towards the middle of the housing in the Y direction, thereby ensuring that the side part occupies the correct position relative to the housing in the second position. As can be seen from the dotted-line drawings in FIGS. 4 and 5, the locking hook 22 of the first locking structure and the elastic plate 23 of the stop have experienced further deformation relative to the first position.

It can be seen from FIG. 6 that the first engagement hooks 21 of the second locking structure 8 are formed in a pair, and their heads are formed with a slope. In the process of moving to the second position, the pair of engagement hooks 21 move towards each other, so as to be able to pass through the allocated fastening eye 31. When in the second position, the engagement hooks 21 spring back, thereby preventing disengagement of the side part in a direction opposite to the direction of insertion.

Figure 7:
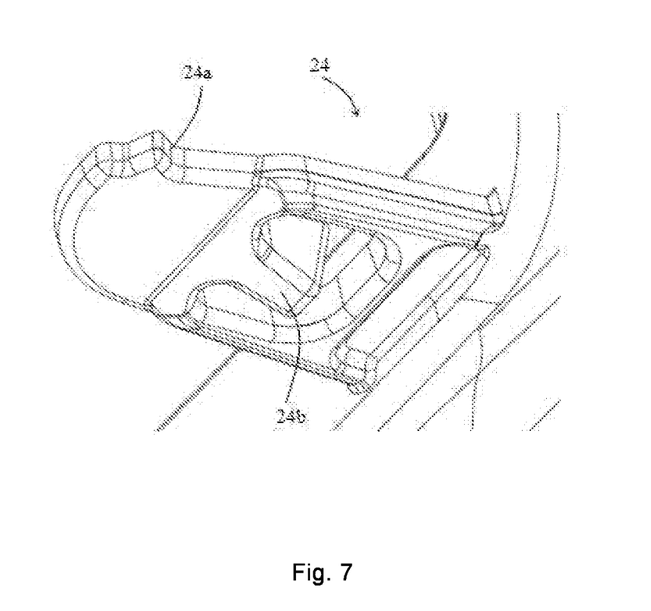
FIG. 7 shows a partial enlarged view of a constituent part of another locking structure of the through-type taillight according to the present invention.

A second engagement hook 24 of the second locking structure 8 is shown schematically in FIG. 7. It can be seen that a bulge 24a is constructed on a peripheral face of the second engagement hook 24, and an elastically deformable tongue 24b is constructed in a middle of the second engagement hook. In the first position, the bulge 24a abuts an edge of the fastening eye 34 allocated to the second engagement hook 24; in the second position, a front end of the tongue 24b abuts on another opposite edge of the fastening eye 34.

The side part 13 can comprise a body 13a, and a flexible part 13b arranged on a periphery of the body 13a. The body 13a and flexible part 13b can be formed separately, and subsequently connected together, e.g. by bonding, snap-fitting or in another way. Alternatively, the body 13a and flexible part 13b can be integrally formed, e.g. by two-component injection molding. In particular by means of the flexible part arranged at the periphery, a gap between the through-type taillight and the vehicle tail component can be covered in the assembled state.

The relevant constituent parts forming the limiting structure 6 and the locking structures 7, 8 are preferably integrally formed on the housing 11 and on the side part 13, more precisely on the body 13a of the side part, as can be seen from FIG. 3; the flexible part 13b of the side part has not been shown here.

The positions and numbers of the limiting structure and locking structures mentioned above can be designed according to specific needs, with no limitation to the examples shown in the drawings.

The present invention is not limited to the structure described above; various other variants could also be used. Although the present invention has already been described by means of a limited number of embodiments, those skilled in the art could, benefiting from this disclosure, design other embodiments which do not depart from the scope of protection of the present invention disclosed herein. Thus, the scope of protection of the present invention should be limited only by the appended claims.

What is claimed is:

1. A through-type taillight, installed in an accommodation of a vehicle tail component, comprising an outer lens, a housing and a side part, with the housing being closed by the outer lens, and together with the outer lens defining an accommodating space for accommodating an optoelectronic component of the through-type taillight, wherein the side part is arranged on a side face of the housing in such a way as to prevent loosening, and at least occupies a first position and a second position relative to the housing, such that in the first position the through-type taillight fits into the accommodation, and in the second position the side part forms a corresponding compensating face of the vehicle tail component.

2. The through-type taillight according to claim 1, wherein the side part is moveably connected to the housing on its side that faces the outer lens, such that the side part is moveable from the first position into the second position.

3. The through-type taillight according to claim 1, wherein the housing is provided with a groove on the side facing the outer lens, and an edge of the side part lies in the groove.

4. The through-type taillight according to claim 3, wherein the edge is provided with a recess, a protrusion is provided in the groove, and the protrusion interacts with the recess.

5. The through-type taillight according to claim 4, wherein at least one additional protrusion is provided in the groove.

6. The through-type taillight according to claim 3, wherein a region of the housing that is adjacent to the groove is provided with at least one projection, and the side part can abut against the projection; or a region of the side part that is adjacent to the edge is provided with at least one projection, and the housing can abut against the projection.

7. The through-type taillight according to claim 1, further comprising by a limiting structure, the limiting structure including at least one first limitation on one of the housing or the side part and at least one first mating limitation on the other, in order to limit movement of the side part in a first direction.

8. The through-type taillight according to claim 7, further comprising a first locking structure, with the locking structure limiting movement of the side part in the first position in a second direction, and a second locking structure, to limit movement of the side part in the second position in the second direction.

9. The through-type taillight according to claim 8, wherein the first locking structure includes a combination of a locking hook assembly and a stop.

10. The through-type taillight according to claim 9, wherein the locking hook assembly includes a first locking hook on one of the housing or the side part and a first mating locking hook on the other.

11. The through-type taillight according to claim 8, wherein the second locking structure includes a lock-fastening assembly.

12. The through-type taillight according to claim 11, wherein the lock-fastening assembly includes at least one engagement hook on one of the housing or the side part and at least one fastening eye on the other.

13. The through-type taillight according to claim 7, wherein the first limitation includes an elastic plate, the first mating limitation includes a hole, and the elastic plate extends into the hole.

14. The through-type taillight according to claim 1, wherein the side part has a body and a flexible part arranged on a periphery of the body.

15. The through-type taillight according to claim 1, wherein the side part is a one-piece member formed by two-component injection molding.

16. The through-type taillight according to claim 8, wherein the limiting structure and the locking structures are integrally formed on the body or the housing.

17. A vehicle, comprising:
a vehicle tail component, the vehicle tail component including a through-type taillight installed in an accommodation of the vehicle tail component, with the through-type taillight including an outer lens, a housing and a side part, with the housing being closed by the outer lens, and together with the outer lens defining an accommodating space for accommodating an optoelectronic component of the through-type taillight, wherein the side part is arranged on a side face of the housing in such a way as to prevent loosening, and at least occupies a first position and a second position relative to the housing, such that in the first position the through-type taillight fits into the accommodation, and in the second position the side part forms a corresponding compensating face of the vehicle tail component.

* * * * *